(12) United States Patent
Cheng (10) Patent No.: US 8,371,709 B2
(45) Date of Patent: Feb. 12, 2013

(54) MULTIPURPOSE HAND LAMP AND ELECTRIC CIGAR LIGHTER ASSEMBLY

(75) Inventor: Hsu-Cheng Cheng, Tucheng (TW)

(73) Assignee: Tang Yang Dies Co., Ltd., Tucheng, Taipei (TW)

( * ) Notice: Subject to any disclaimer, the term of this patent is extended or adjusted under 35 U.S.C. 154(b) by 217 days.

(21) Appl. No.: 13/019,410

(22) Filed: Feb. 2, 2011

(65) Prior Publication Data

US 2011/0199757 A1    Aug. 18, 2011

(30) Foreign Application Priority Data

Feb. 12, 2010    (TW) .............................. 99203170 U (51) Int. Cl.
F23Q 7/16    (2006.01)

(52) U.S. Cl. ......... 362/183; 362/652; 362/488; 219/267

(58) Field of Classification Search .................. 219/552, 219/553, 262, 264–270, 219–220, 240; 362/487–489, 202–205, 208, 183, 394, 190–191, 362/295, 802, 61, 310, 652, 92, 645–647, 362/109, 29, 555, 32, 640, 80, 253, 260, 362/546–549, 217.1–217.17, 374–375; 307/157
See application file for complete search history.

(56) References Cited

U.S. PATENT DOCUMENTS 5,826,967 A * 10/1998 Mathieu ........................... 362/92
2005/0099800 A1 * 5/2005 Andrieu et al. ............... 362/109

* cited by examiner

*Primary Examiner* — Anh Mai
*Assistant Examiner* — Fatima Farokhrooz
(74) *Attorney, Agent, or Firm* — Guice Patents PLLC (57) ABSTRACT

A multipurpose hand lamp comprises a housing accommodating a motherboard assembly carrying a contact switch, a lamp switch and a power socket, a power supply unit electrically connected with the power switch and carrying at least one replaceable rechargeable battery for power input and power output, a light source unit having a lamp cover hinged to the housing and at least LED lamp carried in the lamp cover and electrically connected with the lamp switch for giving off light, and an electric heater having an electric heating wire electrically connected with the contact switch and disposed below a cigarette lighter port of the housing, and a spring-loaded holding-down member for switching on the contact switch to turn on the electric heater when the lamp cover is opened.

10 Claims, 6 Drawing Sheets

MULTIPURPOSE HAND LAMP AND ELECTRIC CIGAR LIGHTER ASSEMBLY

BACKGROUND OF THE INVENTION

1. Field of the Invention

The present invention relates to hand lamps and more particularly, to a multipurpose hand lamp, which provides illumination, cigarette lighting, battery charging and electric power supplying functions.

2. Description of the Related Art

When the light in a car is insufficient, for example, when at night, a supplementary light source may be necessary as a person inside the car is going to control the air-conditioner or car stereo system or to pick up food or beverage. The supplementary light source in a car is a night lamp mounted on the bottom side of the roof that is not freely angularly adjustable to any desired direction.

Therefore, people may prepare a hand lamp in a car for use when desired. A hand lamp uses a dry battery to provide the necessary working voltage. However, when the power of the dry battery is used up, a new supply of dry battery is necessary. Further, in order to keep the air inside a car fresh, a car may be provided with a power socket for power output instead of a cigarette lighter. It may be inconvenient to a cigarette smoker to drive a car that is not equipped with a cigarette lighter.

Taiwan Utility Model Publication Number M363408 discloses a vehicle cigarette lighter entitled "Mobile battery charger and cigarette lighter for car", which comprises a housing, a starter located on the surface of the housing, a circuit board mounted in an accommodation camber inside the housing and electrically connected with the starter, a charging/discharging device, for example, a rechargeable battery set between a positive terminal and a negative terminal at one side of the housing and electrically connected with the circuit board, an electric heater arranged on the housing at a predetermined location and electrically connected with the charging/discharging device, and a DC connector arranged on the circuit board and electrically connected with the charging/discharging device for charging the charging/discharging device.

The positive terminal and the negative terminal of the aforesaid prior art design are arranged to provide a configuration shaped like a cigar head for insertion into a power socket in a car so that the battery power of the car can be transmitted into the circuit board to charge the charging/discharging device subject to the operation of a charging circuit of the circuit board. Further, when switched on the starter, the electric heater (or light source) is turned on. Further, the DC connector is electrically connectable to an external mobile electronic device, for example, cell phone to charge its battery.

According to the aforesaid prior art design, the starter is switchable to move a spring plate among an electric heater conduction zone, a battery conducting zone and a light source conducting zone for connection, thereby providing electric energy to the electric heater or the light source. The operation of this sliding starter design is complicated. Further, the light source simply uses a LED lamp for illumination. This design does not provide any light reflecting or condensing means around the LED lamp to enhance the illumination. Further, when wishing to light a cigarette, the user must open the protective cover and then move the control lever of the starter to shift the spring plate into contact with the electric heater conduction zone and battery conducting zone to form an electric loop. This operation procedure is complicated, and an improvement to simplify the operation is necessary. Further, the charging/discharging device is fixedly set between the positive terminal and the negative terminal, not replaceable. When the charging/discharging device is damaged, the user cannot replace the charging/discharging device and shall have to send the whole assembly to the supplier or distributor for repair.

SUMMARY OF THE INVENTION

The present invention has been accomplished under the circumstances in view. It is therefore the main object of the present invention to provide a multipurpose hand lamp, which provides multiple functions for illumination, charging the battery of an external mobile electronic device and lighting a cigarette, and is easy to operate.

To achieve this and other objects of the present invention, a multipurpose hand lamp comprises a housing, a power supply unit, a light source unit and an electric heater. The housing defines herein an accommodation chamber, having a cigarette lighter port and at least two lugs located on the top side thereof. The power supply unit comprises a motherboard assembly, which is mounted in the accommodation chamber and comprises a contact switch, a lamp switch and a power socket, an electronic control unit built in the motherboard assembly and electrically coupled to the power socket and the contact switch, a positive contact terminal and a negative contact terminal suspending in the accommodation chamber and respectively electrically connected to the motherboard assembly, and at least one rechargeable battery electrically connected between the positive contact terminal and the negative contact terminal to form with the positive contact terminal, the negative contact terminal and the power socket an electric loop. The light source unit comprises a lamp cover, which has at least two mounting blocks pivotally connected to the at least two lugs of the housing by a pivot pin and a through hole on the top side thereof, a circuit board mounted inside the lamp cover and electrically connected with the lamp switch of the motherboard assembly to form an electric loop and at least one LED lamp installed in the circuit board of the light source unit corresponding to the through hole of the lamp cover. The electric heater comprises an electric heating wire disposed inside the housing at a bottom side relative to the cigarette lighter port and electrically connected with the contact switch of the motherboard assembly to form an electric loop, a holding-down member, which has a top contact end extending out of the housing through a gap between the two lugs and stopped against the mounting blocks, a bottom rod stopped against a part inside the housing and a first press rod adapted for pressing the contact switch, and a spring member sleeved onto the bottom rod of the holding-down member and stopped between the holding-down member and the housing. Opening the lamp cover causes the lamp cover to squeeze the contact end of the holding-down member downward in forcing the bottom rod to compress the spring member and the first press rod to switch on the contact switch, enabling the at least one rechargeable battery to provide a battery power supply to the motherboard assembly and the electric heating wire for lighting a cigarette.

DETAILED DESCRIPTION OF THE PREFERRED EMBODIMENT

As shown in FIGS. 1-4, basically, a multipurpose hand lamp in accordance with the present invention is shown comprising a housing 1, a power supply unit 2, a light source unit 3 and an electric heater 4.

Figure 1:
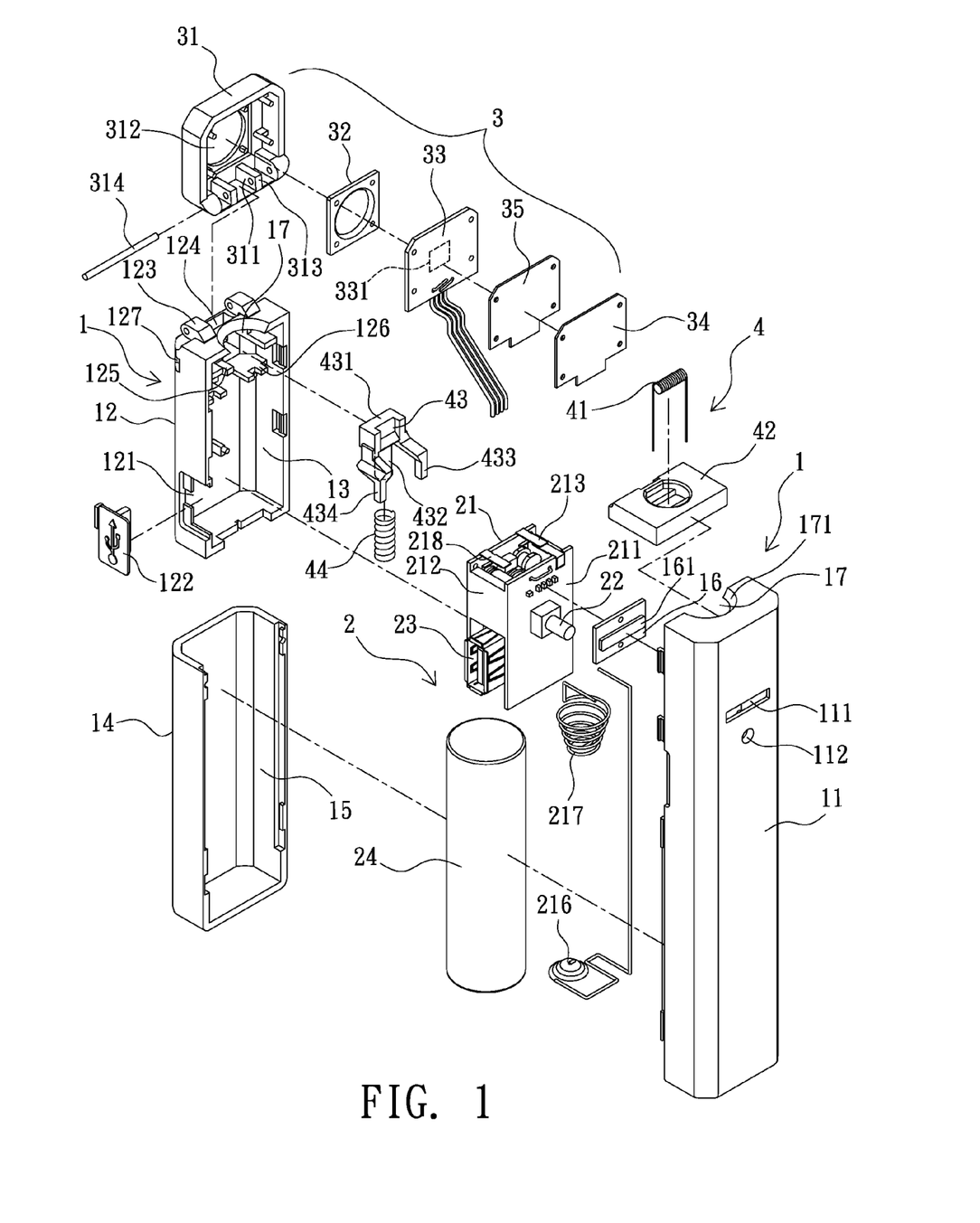
FIG. 1 is an exploded view of a multipurpose hand lamp in accordance with the present invention.

The housing 1 includes an elongated body shell 11 having an elongated view hole 111 and a round hole 112, a cover shell 12 fixedly covered on the upper part of the elongated body shell 11, a battery lid 14 movably, for example, slidably covered on the lower part of the elongated body shell 11 so that at least one accommodation chamber inside the housing is formed. The inside space of the housing 1 is divided by a partition wall into a first accommodation chamber 13 at the top side and a second accommodation chamber 15 at the bottom side. The first accommodation chamber 13 is adapted for accommodating a motherboard assembly 21 that can be, for example, a double-sided circuit board. The second accommodation chamber 15 is adapted for accommodating a rechargeable battery 24. Further, a transparent lampshade 16 is mounted inside the elongated body shell 11, having a protruding portion 161 fitted into the view hole 111.

Figure 2:
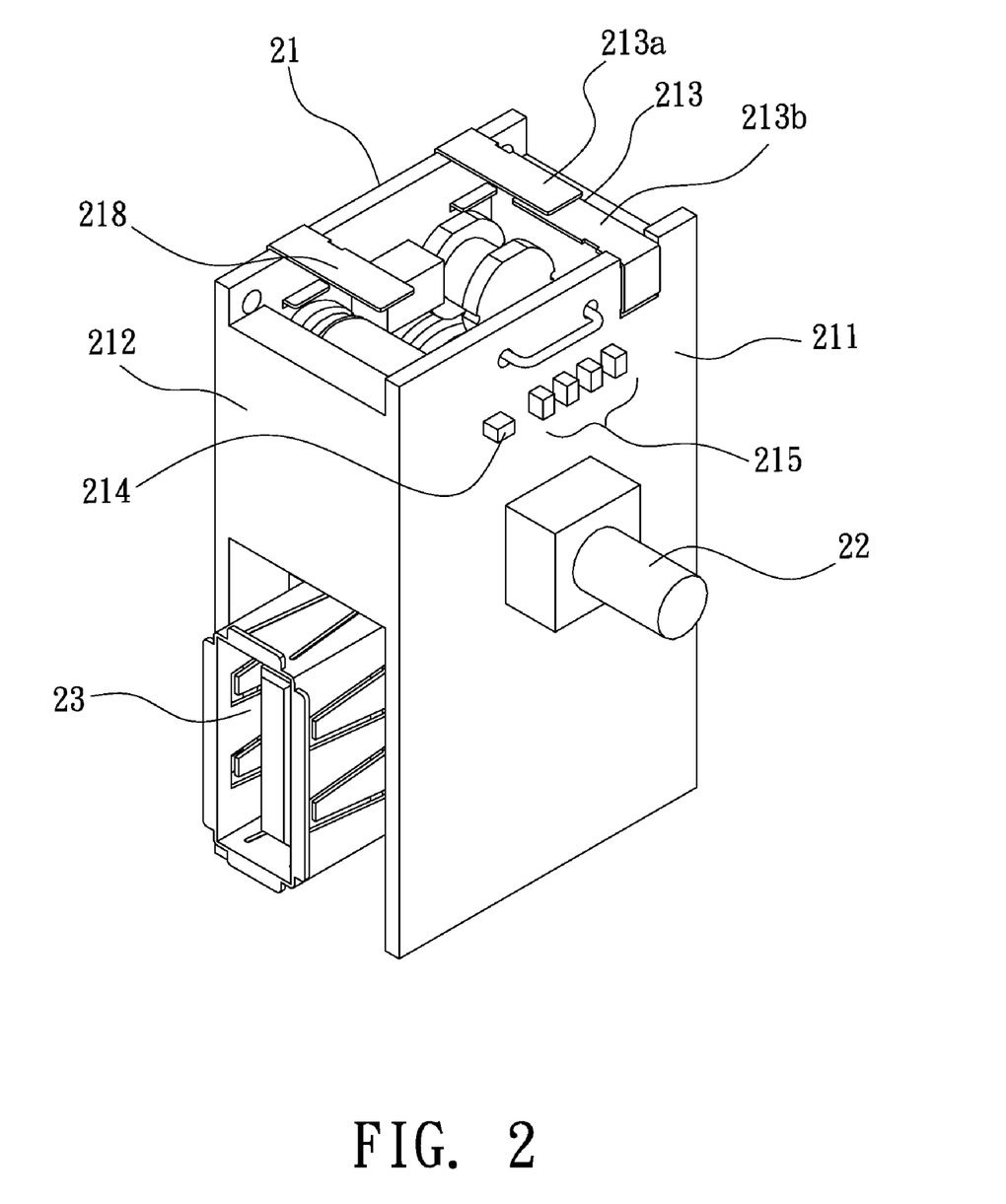
FIG. 2 is an elevational view of the motherboard assembly of the multipurpose hand lamp in accordance with the present invention.

The power supply unit 2 comprises the aforesaid motherboard assembly 21 that is accommodated in the first accommodation chamber 13. The motherboard assembly 21 comprises two first circuit boards 211, two spacer blocks 212 bilaterally set between the two first circuit boards 211, a contact switch 213 that has two contact terminals 213a and 213b arranged one above the other at a top side relative to the two first circuit boards 211, a lamp switch 22 electrically coupled to one first circuit board 211 and extending out of the elongated body shell 11 through the round hole 112 for operation, indicator means, for example, a charge indicator lamp 214 and a plurality of power volume indicator lamps 215 electrically connected to the same first circuit board 211 and covered by the transparent lampshade 16.

The power supply unit 2 further comprises a power socket 23 that can be, for example, a USB connector electrically coupled to the other first circuit board 211. The cover shell 12 has an insertion slot 121 corresponding to the power socket 23. An elastic cap 122 is adapted for closing the insertion slot 121 to seal the insertion slot 121 against fluid, dust or any of a variety of other external objects. The aforesaid motherboard assembly 21 further comprises a positive electrode 216 and a negative electrode 217 respectively set in the second accommodation chamber 15. Further, at least one rechargeable battery 24 is electrically connected between the positive electrode 216 and the negative electrode 217.

Thus, power cable having a USB type power plug at its one end and an electric connector at its other end can be used and electrically connected between the power socket 23 and a port of a computer or the cigarette lighter socket of a motor vehicle for enabling transmission of DC power supply from the computer or motor vehicle to the power socket 23 to charge the rechargeable battery 24 subject to the control of an ECU (electronic control unit) that is built in the motherboard assembly 21. At this time, the charge indicator lamp 214 is turned on to indicate the charging status, and the power level indicator lamps 215 are selectively turned on to indicate the volume of electric power of the rechargeable battery 24.

The light source unit 3 comprises a lamp cover 31, which has at least two mounting blocks 311 pivotally connected to, for example, two lugs 123 at the cover shell 12 of the housing 1 by a pivot pin 314, a lens, for example, convex lens 32 mounted in a through hole 312 on the lamp cover 31, a second circuit board 33 mounted in the lamp cover 31 and electrically connected to the motherboard assembly 21 to form with the lamp switch 22 an electric loop, at least one LED lamp 331 electrically coupled to the second circuit board 33, a cover plate 34 covering the bottom open side of the lamp cover 31. Further, the cover plate 34 can be made of aluminum. In this case, an insulative pad 35 must be set in between the second circuit board 33 and the cover plate 34.

Thus, when clicked the lamp switch 22 once, the LED lamp 331 is turned on to give off light. When clicked the lamp switch 22 twice, the LED lamp 331 is driven to flash, giving a visual warning signal. When keeps the lamp switch 22 pressed for more than 2 seconds, the LED lamp 331 will be turned off, or provide an extra switching function.

The electric heater 4 is mounted in the first accommodation chamber 13 of the housing 1 below a cigarette lighter port 17 at the top side of the housing 1. The cigarette lighter port 17 is a human-friendly design, having a tapered inside wall 171 that facilitates insertion of a cigarette into the cigarette lighter port 17 for lighting by the electric heater 4. The electric heater 4 comprises an electric heating wire 41 electrically connected with the contact switch 213 of the motherboard assembly 21 to form an electric loop, and a ceramic heater holder 42 that holds the electric heating wire 41 in place.

The electric heater 4 further comprises a holding-down member 43, and a spring member 44. The holding-down member 43 is a multi-fork member, having a top contact end 431, which extends out of an opening 124 on the cover shell 12 of the housing 1 between the two lugs 123 and stopped against a beveled edge 313 on each of the mounting blocks 311, and a bottom rod 432 that extends through (a hole on) a stop plate 125 in the cover shell 12. The spring member 44 is a spring coil sleeved onto the bottom rod 432 and stopped between the holding-down member 43 and the stop plate 125. The holding-down member 43 further has a first press rod 433 disposed at one lateral side corresponding to the contact switch 213, and a second press rod 434 disposed at an opposite lateral side. The first press rod 433 and the second press rod 434 are respectively inserted through a respective rib plate 126 in the cover shell 12. The rib plates 126 are adapted to guide movement of the holding-down member 43 in vertical direction. When the contact switch 213 of the motherboard assembly 21 and a return spring 218 are respectively pressed by the first press rod 433 and second press rod 434 of the holding-down member 43, the two contact terminals 213a and 213b of the contact switch 213 are forced into contact with each other to close the circuit loop, allowing transmission of electric power from the rechargeable battery 24 to the motherboard assembly 21 and then the electric heating wire 41, causing the electric heating wire 41 to become hot for lighting a cigarette.

Further, to assure user's safety and to avoid the electric heater 4 from wasting electric energy, the ECU (electronic control unit) of the motherboard assembly 21 automatically cuts off power supply, a predetermined period of time, for example, 10 seconds after opening of the lamp cover 31, even if the first press rod 433 of the holding-down member 43 is kept pressed on the contact switch 213. When wishing to light a cigarette again, close the lamp cover 31 and then open it again to reset the ECU (electronic control unit) of the motherboard assembly 21, enabling the battery power supply to be transmitted from the rechargeable battery 24 to the motherboard assembly 21 and then the electric heating wire 41 of the electric heater 4.

Further, when turned on the light source unit 3 or the electric heater 4, the ECU (electronic control unit) of the motherboard assembly 21 selectively drives one of the power level indicator lamps 215 to give off light for a predetermined period of time, for example, 5 seconds, indicating the remaining power level of the rechargeable battery 24.

Figure 3:
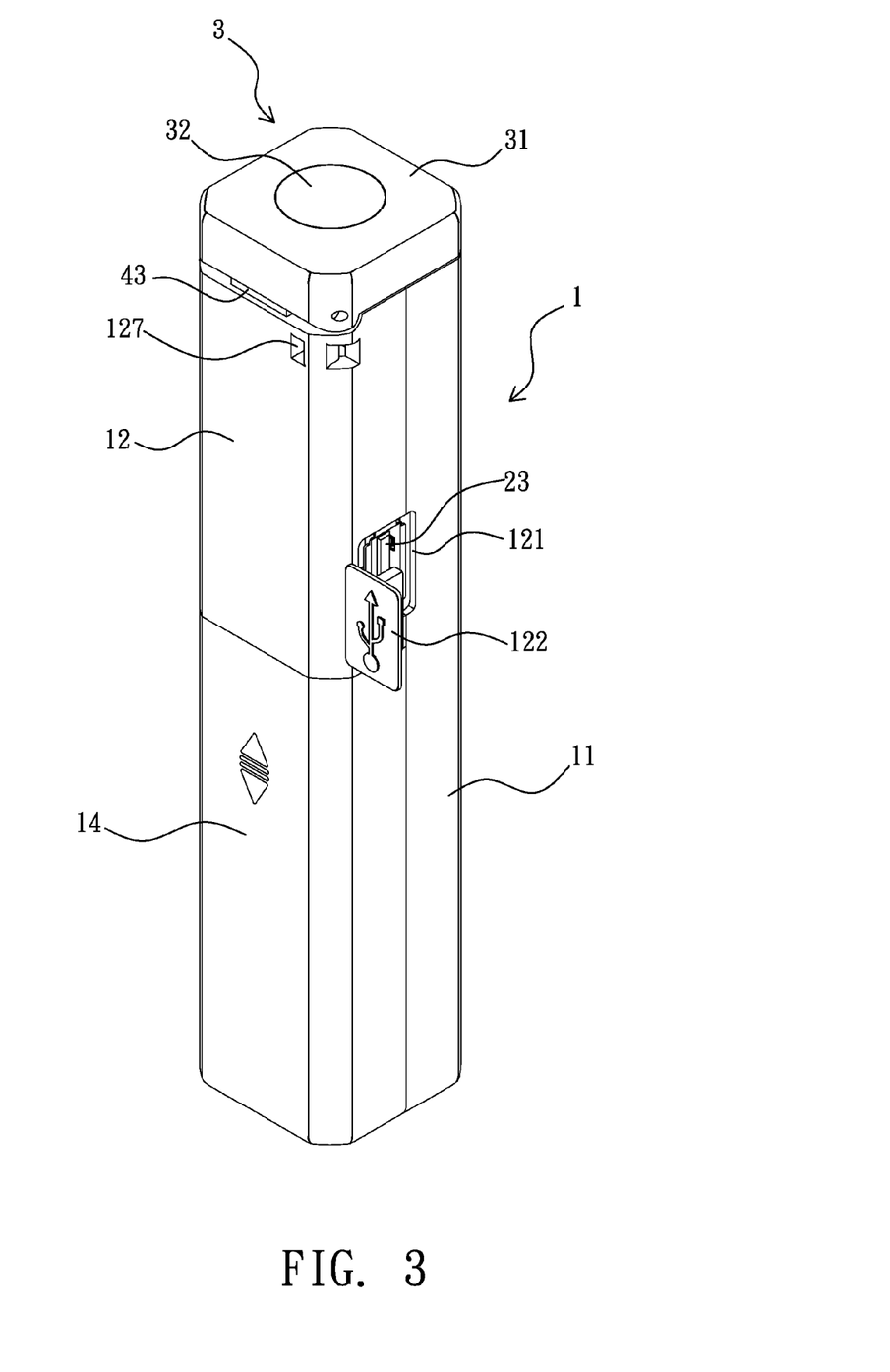
FIG. 3 is an elevational assembly view of the present invention, illustrating the lamp cover of the multipurpose hand lamp closed.

Referring to FIG. 3, the cover shell 12 of the housing 1 has a hanging hole 127 for the mounting of a hanging ornament or keychain. Further, a USB connector of a cable can be inserted through the insertion slot 121 and electrically connected to the USB connector type power socket 23 to charge the rechargeable battery 24 subject to the control of the ECU (electronic control unit) of the motherboard assembly 21.

Figure 4:
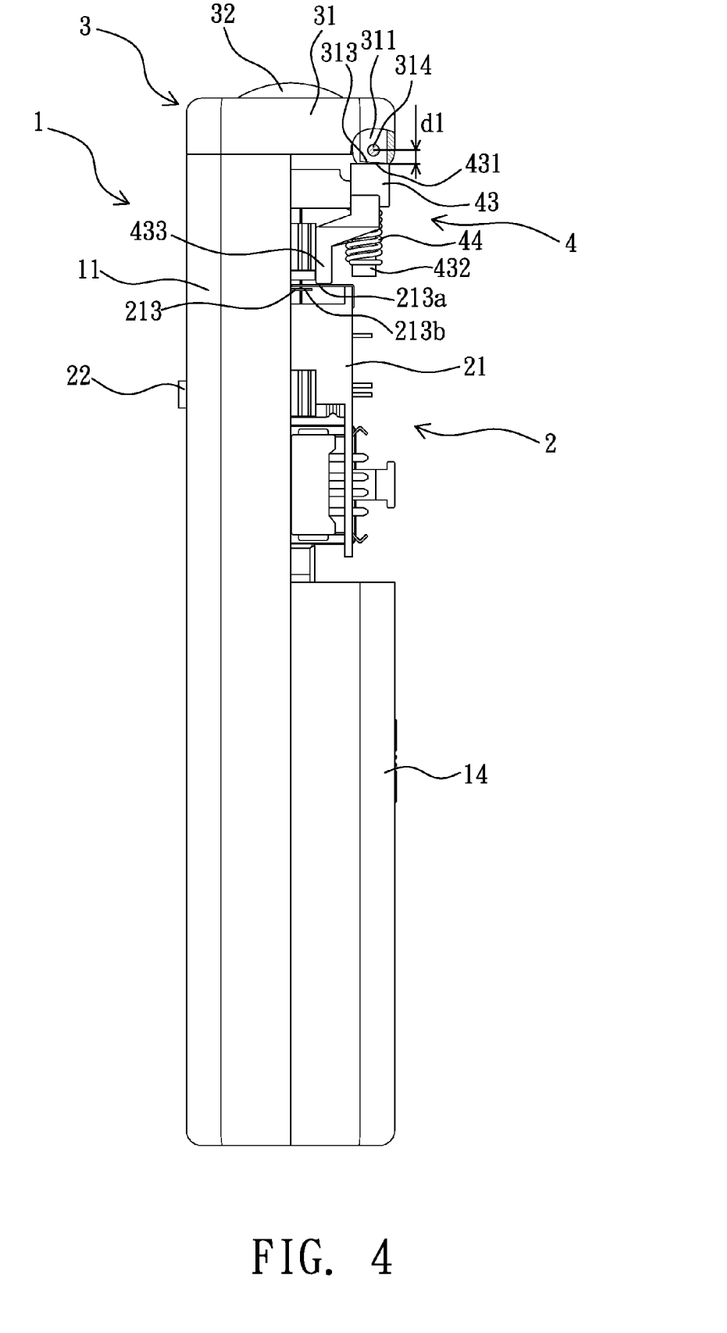
FIG. 4 is a front view of the present invention after removal of the cover shell from the housing, showing the lamp cover closed.

Referring to FIG. 4, after removal of the cover shell 12, the relationship between the lamp cover 31 and the holding-down member 43 are clearly seen. Subject to the design of the beveled edge 313 on each of the mounting blocks 311 of the lamp cover 31 and the effect of the spring member 44 to force the contact end 431 of the holding-down member 43 against the beveled edge 313 on each of the mounting blocks 311, a downward moment is produced at one side of the lamp cover 31 opposite to its pivot connection side, avoiding vibration when the lamp cover 31 is closed. Further, the distance dl between the pivot pin 314 and the beveled edge 313 on each of the mounting blocks 311 is shorter than the distance between the pivot pin 314 and the right side wall of the lamp cover 31.

Figure 5:
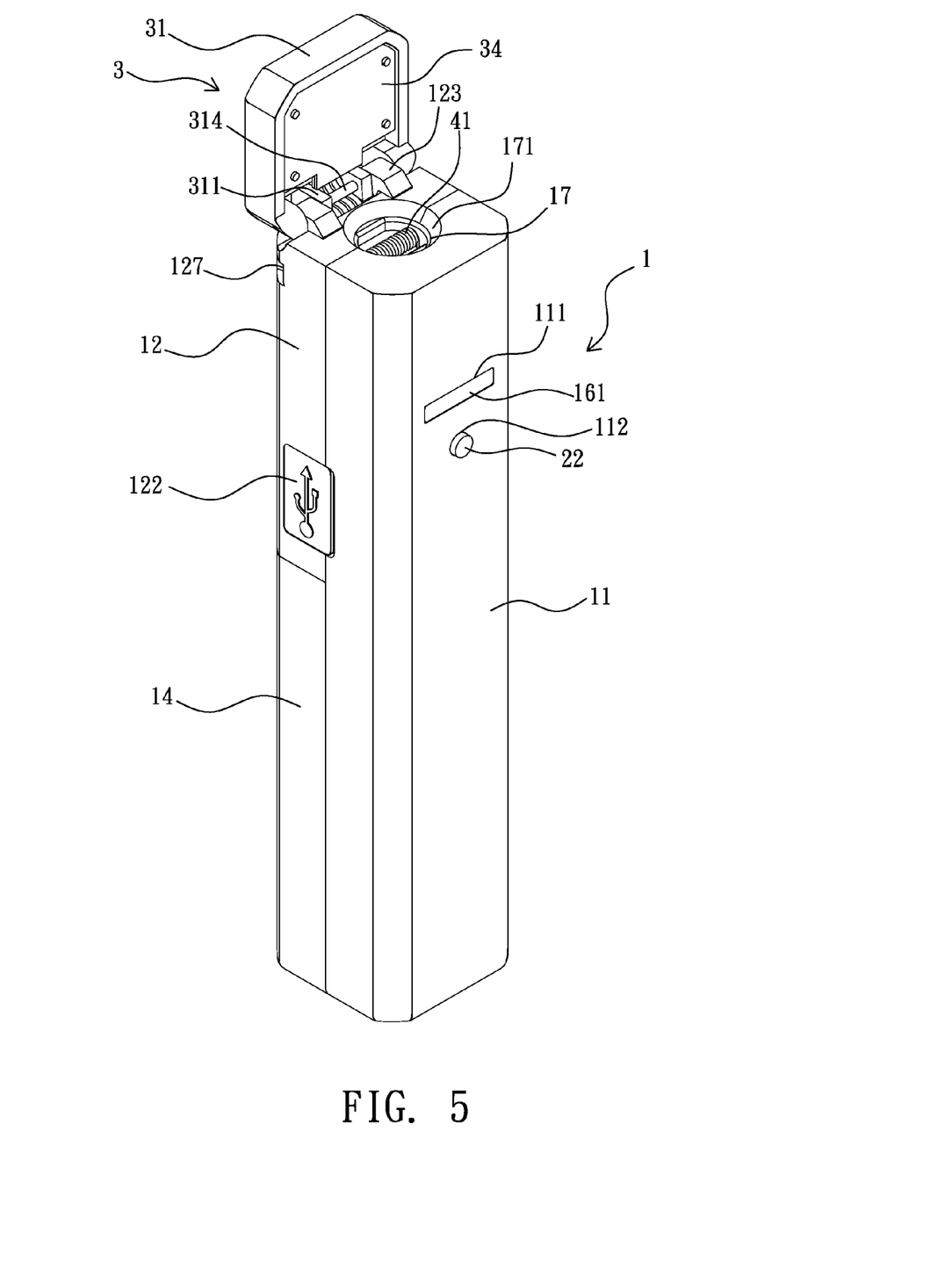
FIG. 5 is an elevational assembly view of the multipurpose hand lamp in accordance with the present invention, illustrating the lamp cover of the multipurpose hand lamp opened.
Figure 6:
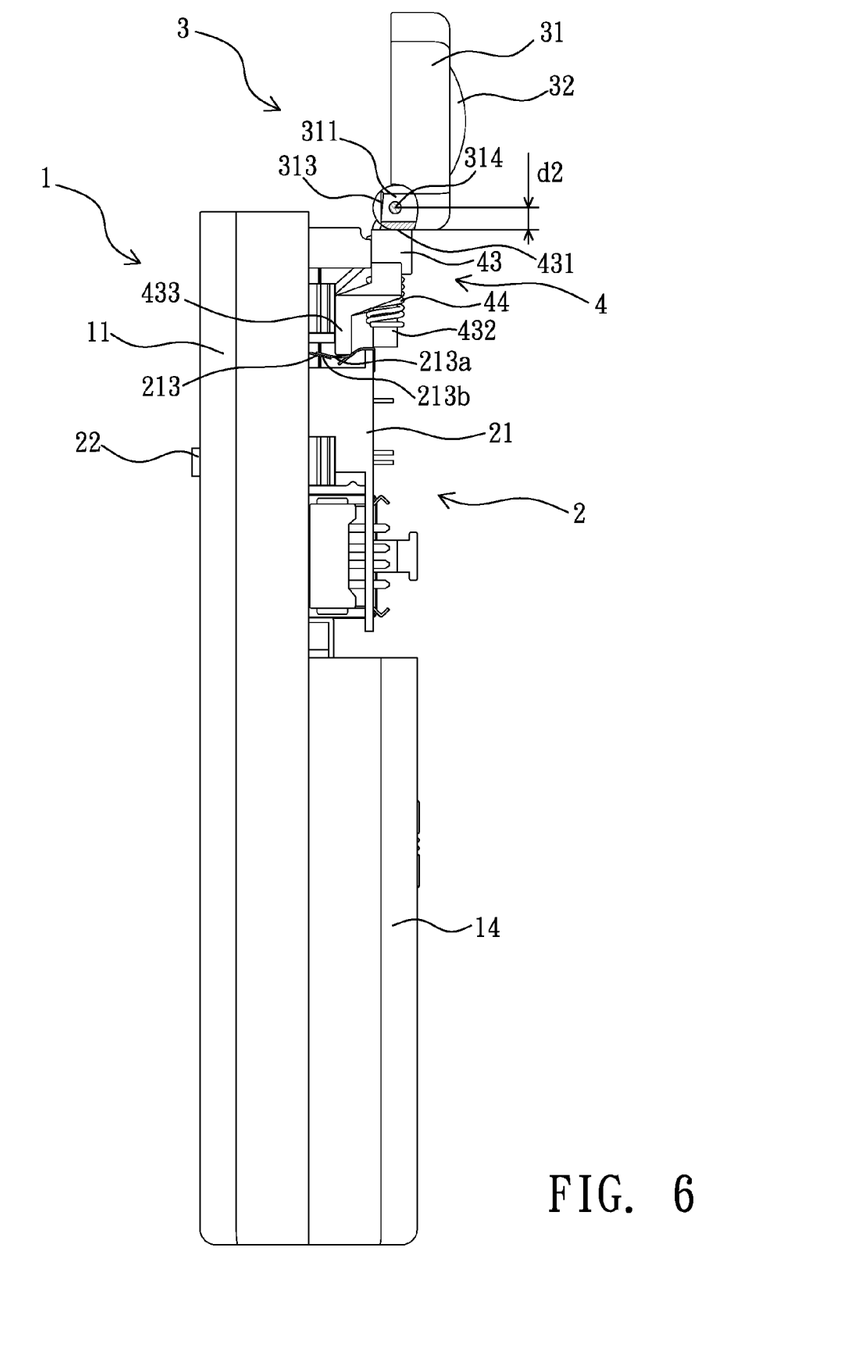
FIG. 6 is similar to FIG. 4 but showing the lamp cover opened.

Referring to FIGS. 5 and 6, when opening the lamp cover 31, due to the design that the distance dl between the pivot pin 314 and the beveled edge 313 on each of the mounting blocks 311 is shorter than the distance between the pivot pin 314 and the right side wall of the lamp cover 31, the right side wall of the lamp cover 31 will be vertically pressed on the contact end 431 of the holding-down member 43, forcing the bottom rod 432 to compress the spring member 44, and the first and second press rods 433 and 434 will touch the contact switch 213 and the return spring 218, thereby causing the contact terminals 213a and 213b to be electrically connected. When the contact terminals 213a and 213b are electrically connected, the battery power supply is transmitted from the rechargeable battery 24 to the motherboard assembly 21 and then the electric heating wire 41, causing the electric heating wire 41 to become hot for lighting a cigarette. If the user switches on the lamp switch 22 at this time, the LED lamp 331 will be turned on to give off light for illumination.

Further, except for power input, the power socket 23 of the motherboard assembly 21 can be electrically connected to an external mobile electronic device, such as cell phone, MP3, MP4, etc., through a power cable to charge the battery of the external mobile electronic device subject to the control of the ECU (electronic control unit) of the motherboard assembly 21. Further, by means of opening and closing the battery lid 14, the user can replace the rechargeable battery 24. Except the advantage for use as a battery charger, the invention allows replacement of the rechargeable battery 24. Thus, the user can prepare multiple well-charged rechargeable batteries as spare members for replacement, expanding the charging capacity. This advantage is not achievable by conventional designs that use a single, fixed type rechargeable battery.

In conclusion, the invention provides a multipurpose hand lamp, which has the advantages and features as follows:

1. When compared to the prior art techniques that require a complicated operation procedure, the invention allows the user to light cigarettes rapidly within a short time; according to test, when the rechargeable battery is at full energy, the multipurpose hand lamp can light more than 200 pcs cigarettes (10 packages), i.e., the invention is power saving in operation.
2. The light source and the electric heater are separately controlled by means of the lamp switch and the holding-down member, facilitating operation and eliminating the inconvenience problem of the prior art single sliding starter design.
3. Simply by means of opening or closing the lamp cover to close or open the electric loop of the electric heater, the user can turn on/off the electric heater conveniently, avoiding the complicated operation procedure of the prior art single sliding starter design.
4. Subject to the special ECU (electronic control unit) design, the USB type power socket can be used for power input as well as for power output; the replaceable rechargeable battery design allows the user to replace the rechargeable battery conveniently.
5. The ECU (electronic control unit) also controls the indicator lamps for charging indication and power level indication.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A multipurpose hand lamp, comprising:
   a housing defining therein an accommodation chamber, said housing having a cigarette lighter port and at least two lugs located on a top side thereof;
   a power supply unit, said power supply unit comprising a motherboard assembly mounted in said accommodation chamber, said motherboard assembly comprising a contact switch, a lamp switch and a power socket, an electronic control unit built in said motherboard assembly and electrically coupled to said power socket and said contact switch, a positive contact terminal and a negative contact terminal suspending in said accommodation chamber and respectively electrically connected to said motherboard assembly, and at least one rechargeable battery electrically connected between said positive contact terminal and said negative contact terminal to form with said positive contact terminal, said negative contact terminal and said power socket an electric loop;
   a light source unit, said light source unit comprising a lamp cover, said lamp cover having at least two mounting blocks pivotally connected to said at least two lugs of said housing by a pivot pin and a through hole on a top side thereof, a circuit board mounted inside said lamp cover and electrically connected with said lamp switch of said motherboard assembly to form an electric loop and at least one LED lamp installed in said circuit board of said light source unit corresponding to said through hole of said lamp cover; and
   an electric heater, said electric heater comprising an electric heating wire disposed inside said housing at a bottom side relative to said cigarette lighter port and electrically connected with said contact switch of said motherboard assembly to form an electric loop, a holding-down member, said holding-down member having a top contact end extending out of said housing through a gap between said two lugs and stopped against said mounting blocks, a bottom rod stopped against a part inside said housing and a first press rod adapted for pressing said contact switch, and a spring member sleeved onto said bottom rod of said holding-down member and stopped between said holding-down member and said housing;

wherein opening said lamp cover causes said lamp cover to squeeze said contact end of said holding-down member downward in forcing said bottom rod to compress said spring member and said first press rod to switch on said contact switch, enabling said at least one rechargeable battery to provide a battery power supply to said motherboard assembly and said electric heating wire for lighting a cigarette.

2. The multipurpose hand lamp as claimed in claim 1, wherein said power socket is a USB (universal serial bus) connector.

3. The multipurpose hand lamp as claimed in claim 1, wherein said motherboard assembly comprises two circuit boards and two spacer blocks set between said two circuit boards; said contact switch is arranged on said two circuit boards at a top side, comprising two contact terminals arranged one above the other.

4. The multipurpose hand lamp as claimed in claim 1, wherein said motherboard assembly further comprises indicator means electrically coupled to said electronic control unit, said indicator means comprising a charge indicator lamp and a plurality of power volume indicator lamps and transparent lampshade covering said charge indicator lamp and said power volume indicator lamps and partially protruding out of a view hole on said housing.

5. The multipurpose hand lamp as claimed in claim 1, wherein said light source unit further comprises a convex lens mounted in said through hole of said lamp cover.

6. The multipurpose hand lamp as claimed in claim 1, wherein said light source unit further comprises a cover plate covering a bottom open side of said lamp cover and an insulative pad set in between the circuit board and cover plate of said light source unit.

7. The multipurpose hand lamp as claimed in claim 1, wherein said cigarette lighter port has a tapered inside wall.

8. The multipurpose hand lamp as claimed in claim 1, wherein said electric heater further comprises a ceramic holder holding said electric heating wire.

9. The multipurpose hand lamp as claimed in claim 1, wherein said holding-down member further has a second press rod disposed at one lateral side opposite to said first press rod; said motherboard assembly further comprises a return spring set corresponding to said second press rod of said holding-down member; said housing further comprises two rib plates protruded from an inside wall thereof and adapted for guide movement of said holding-down member in vertical.

10. The multipurpose hand lamp as claimed in claim 1, wherein said housing further has a hanging hole.

\* \* \* \* \*